United States Patent
Inoue

(10) Patent No.: US 7,911,569 B2
(45) Date of Patent: Mar. 22, 2011

(54) METHOD OF PRODUCING OPTICAL LAMINATE AND IMAGE DISPLAYING APPARATUS

(75) Inventor: Tetsuo Inoue, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 290 days.

(21) Appl. No.: 12/279,781

(22) PCT Filed: Feb. 4, 2008

(86) PCT No.: PCT/JP2008/051728
§ 371 (c)(1),
(2), (4) Date: Aug. 18, 2008

(87) PCT Pub. No.: WO2008/102631
PCT Pub. Date: Aug. 28, 2008

(65) Prior Publication Data
US 2010/0220271 A1 Sep. 2, 2010

(30) Foreign Application Priority Data
Feb. 19, 2007 (JP) ................................ 2007-037352

(51) Int. Cl.
*G02F 1/1335* (2006.01)
(52) U.S. Cl. .......................................... 349/117; 349/96
(58) Field of Classification Search ............ 349/96–103, 349/117–121, 187, 192
See application file for complete search history.

(56) References Cited

U.S. PATENT DOCUMENTS

| | | | |
|---|---|---|---|
| 5,739,296 A | 4/1998 | Gvon et al. | 534/577 |
| 6,583,284 B1 | 6/2003 | Sidorenko et al. | |
| 7,108,749 B2 | 9/2006 | Bobrov | 118/261 |
| 2002/0005919 A1 | 1/2002 | Bobrov | |
| 2005/0109986 A1 | 5/2005 | Dutova et al. | |

FOREIGN PATENT DOCUMENTS

| | | |
|---|---|---|
| JP | 2002-090547 A | 3/2002 |
| JP | 2006-293025 A | 10/2006 |
| WO | 2004-014874 A1 | 2/2004 |
| WO | 2005-051926 A1 | 6/2005 |

OTHER PUBLICATIONS

International Search Report of PCT/JP2008/051728, date of mailing Mar. 4, 2008.

*Primary Examiner* — Rhonda S Peace
(74) *Attorney, Agent, or Firm* — Westerman, Hattori, Daniels & Adrian, LLP

(57) ABSTRACT

With regard to an optical laminate having a applied film containing a lyotropic liquid crystalline compound, the present invention provides a method of producing an optical laminate that can prevent this applied film from becoming white turbidity.

The present invention is a method of producing an optical laminate having a base material and a applied film laminated on at least one surface of the base material and containing a lyotropic liquid crystalline compound, where the method includes a step A of applying a solution containing at least one kind of a lyotropic liquid crystalline compound on a base material to form a wet applied film, and a step B of drying the wet applied film by spraying a wind onto the surface of the wet applied film simultaneously with this step A or after performing this step A and before the wet applied film is dried. In this step B, the wind is sprayed preferably in a tilted direction, and the wind direction is preferably from 0° to 60° or below relative to the plane of the base material.

11 Claims, 2 Drawing Sheets

METHOD OF PRODUCING OPTICAL LAMINATE AND IMAGE DISPLAYING APPARATUS

TECHNICAL FIELD

The present invention relates to a method of producing an optical laminate used in an image displaying apparatus or the like as well as to usage of the optical laminate.

BACKGROUND ART

A liquid crystal displaying apparatus is an apparatus for displaying characters and images by using electrooptical characteristics of liquid crystal molecules. As constituent members of an image displaying apparatus such as a liquid crystal displaying apparatus, a polarizing element (which is also referred to as a polarizer or a polarizing film) that can take out specific polarized light and a retardation element (which is also referred to as a retardation film or an optical compensation layer) that brings about a predetermined retardation are used.

Typically, in such a polarizing element or a retardation element, a polymer film, a film containing a liquid crystalline compound, and the like are used. A polarizing element or a retardation element using a lyotropic liquid crystalline compound among the liquid crystalline compounds is known (patent documents 1 and 2).

Since the lyotropic liquid crystalline compound shows a liquid crystal phase in a solution state, an applied film being a thin film as compared with a polymer film can be formed by applying a compound solution prepared in a liquid crystal phase on a suitable base material, followed by drying. The applied film is utilized for usage such as a polarizing element or a retardation element.

[Patent Document 1]
Japanese Patent Application Laid-Open (JP-A) No. 2002-277636
[Patent Document 2]
Japanese Patent Application Laid-Open (JP-A) No. 2002-241434

SUMMARY OF THE INVENTION

However, an applied film formed from the above solution of the lyotropic liquid crystalline compound may generate white turbidity during the production process thereof. The applied film thus having become white turbidity is inferior in the optical characteristics and is not suitable as a polarizing element or a retardation element, so that an improvement thereof is demanded.

With regard to an optical laminate having an applied film containing a lyotropic liquid crystalline compound, an object of the present invention is to provide a method of producing the optical laminate that can prevent the applied film from becoming white turbidity.

The present inventors have made intensive studies on the cause of becoming white turbidity described above, and found that the applied film becomes white turbidity during the process of drying a wet applied film containing the lyotropic liquid crystalline compound. This seems to be because, with the conventional method, the drying time for drying the wet applied film is long, and fluidity or alleviation occurs in the wet applied film whereby the orientation state of the molecules of the liquid crystalline compound becomes disturbed.

The present invention provides a method of producing an optical laminate having a base material and an applied film laminated on at least one surface of the base material and containing a lyotropic liquid crystalline compound, comprising a step A of applying a solution containing at least one kind of a lyotropic liquid crystalline compound on a base material to form a wet applied film; and a step B of drying the wet applied film by spraying a wind onto the surface of the wet applied film simultaneously with the step A or after performing the step A and before the wet applied film is dried.

The above method of producing an optical laminate can dry the wet applied film in a short period of time because wind is sprayed onto the surface of the wet applied film. The obtained applied film does not generate white turbidity, so that the optical laminate in which this film is laminated on the base material has an optically high uniformity. Therefore, according to the method of producing an optical laminate of the present invention, an optical laminate being excellent in light transmittance and substantially not generating the white turbidity can be produced.

In a preferable embodiment of the production method of the present invention, the aforesaid lyotropic liquid crystalline compound contains a polycyclic compound represented by the following formula (I).

[chemical formula 1]

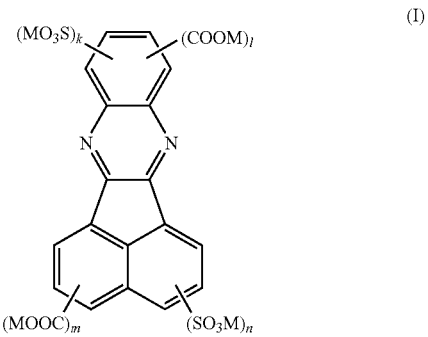

Where in the formula (I), M represents a counter ion, and k, l, m, and n represent a number of substitutions (k and l are an integer from 0 to 4, and m and n are an integer from 0 to 6), where k, l, m, and n are not simultaneously 0.

In another preferable embodiment of the production method of the present invention, the aforesaid optical laminate is a polarizing element or a retardation element.

Also, in another preferable embodiment of the production method of the present invention, the aforesaid base material is a polymer film or a laminate containing a polymer film.

Further, in another preferable embodiment of the production method of the present invention, the aforesaid base material is a laminate containing a polymer film and an orientation film.

In another preferable embodiment of the production method of the present invention, the aforesaid wet applied film is formed to have a thickness of from 0.5 to 100 μm in aforesaid step A.

Also, in another preferable embodiment of the production method of the present invention, aforesaid wind is sprayed in a tilted direction relative to the plane of aforesaid base material in aforesaid step B.

Further, in another preferable embodiment of the production method of the present invention, the direction of aforesaid wind exceeds 0° and is below or equal to 60° relative to the plane of aforesaid base material.

Also, in another preferable embodiment of the production method of the present invention, the aforesaid wind has a temperature from 0 to 80° C.

Further, in another preferable embodiment of the production method of the present invention, the flow rate of aforesaid wind is above or equal to 1 liter/minute per 100 cm² of the wet applied film.

Also, the present invention provides an image displaying apparatus having an optical laminate obtained by the production method according to any one of the aforesaid method of producing an optical laminate.

BEST MODES FOR CARRYING OUT THE INVENTION

The method of producing an optical laminate of the present invention performs at least a step A: applying a solution containing at least one kind of a lyotropic liquid crystalline compound on a base material to form a wet applied film, and a step B: drying the wet applied film by spraying a wind onto the surface of the wet applied film simultaneously with the step A or after performing the step A and before the wet applied film is dried.

Hereinafter, the present invention will be specifically described.

<Optical Laminate of the Present Invention>

An optical laminate obtained by the production method of the present invention has a base material and an applied film containing a lyotropic liquid crystalline compound.

Figure 1A:
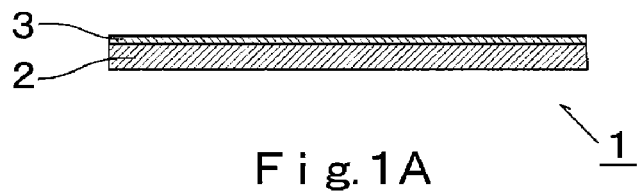
FIGS. 1A and 1B are a cross-sectional view showing one example of a layer construction of an optical laminate of the present invention.
Figure 1B:
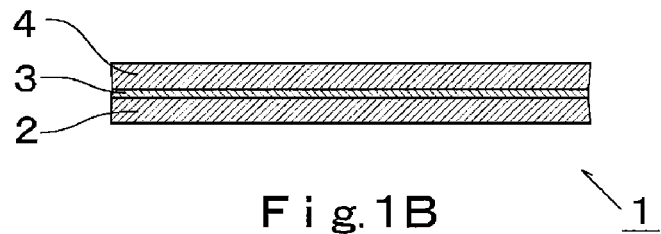

The optical laminate may be a two-layer laminate 1 made of a base material 2 and an applied film 3 as shown in FIG. 1A, or may be a three-or-more-layer laminate 1 including other layer 4 in addition to the base material 2 and the applied film 3 as shown in FIG. 1B. The other layer 4 may be, for example, a retardation element, a polarizing element, an adhesive layer, or the like.

(Base Material)

The above base material is used for uniformly developing a solution containing a lyotropic liquid crystalline compound. The base material is not particularly limited as long as it can develop the solution uniformly, and for example, a synthetic resin film (the term "film" is meant to include those generally referred to as sheets), a glass plate, or the like can be used. In a preferable embodiment, the base material is a single polymer film. In another preferable embodiment, the base material is a laminate including a polymer film. The laminate including a polymer film further preferably includes an orientation film in addition to the polymer film.

The above polymer film is not particularly limited, however, a film being excellent in transparency is preferable (for example, having a haze value of 5% or smaller).

Examples of the polymer film include a film formed from a polymer such as polyester type such as polyethylene terephthalate and polyethylene naphthalate; cellulose type such as diacetylcellulose and triacetylcellulose; polycarbonate type; acryl type such as polymethyl methacrylate; styrene type such as polystyrene and an acrylonitrile-styrene copolymer; olefin type such as polyethylene, polypropylene, polyolefins having a cyclic or norbornene structure, and an ethylene-propylene copolymer; vinyl chloride type; amide type such as nylon and aromatic polyamide; imide type such as polyimide; polyethersulfone type; polyetheretherketone type; polyphenylene sulfide type; vinyl alcohol type; vinylidene chloride type; vinyl butyral type; acrylate type; polyoxymethylene type; epoxy type; and a mixture containing two or more kinds of these polymer or the like. Also, the polymer film may be a film formed from a laminate body of two or more kinds of the above polymer films.

For these polymer films, a stretched film is preferably used, and further a film being excellent in transparency is used.

In the case that the above base material contains an orientation film, this orientation film is preferably subjected to the orientation treatment. Examples of the above orientation treatment include a mechanical orientation treatment such as a rubbing treatment, a chemical orientation treatment such as an optical orientation treatment, and the like.

The mechanical orientation treatment can be carried out by rubbing in one direction with a cloth or the like on one surface of the base material (or one surface of a suitable applied film formed on one surface of the base material). By this, an orientation film can be formed on one surface of the base material. Also, a stretched film having been subjected to a stretching treatment can be used. The applied film or the other film on which the rubbing treatment, the stretching treatment or the like is performed is not particularly limited, so that the above polymer exemplified as the film for the above base material or the like can be used. The orientation film is preferably an imide type polymer in view of the orientation efficiency of the liquid crystalline compound.

The chemical orientation treatment can be carried out by forming an optical orientation film containing an orientation agent on one surface of the base material and radiating light onto the optical orientation film. By this, an orientation film can be formed on one surface of the base material. Examples of the orientation agent include polymers having a photoreactive functional group that generates a photochemical reaction such as a photoisomerization reaction, an optical ring-opening-closing reaction, a photodimerization reaction, a photodecomposition reaction, and an optical Fries rearrangement reaction, and the like. The above optical orientation film can be formed by dissolving an orientation agent into a suitable solvent to form a solution and applying this solution onto a base material.

The thickness of the above base material can be suitably designed in accordance with the strength and the like. However, in view of thickness reduction and weight reduction, the thickness is preferably 300 μm or smaller, more preferably from 5 to 200 μm, most preferably from 10 to 100 μm.

(Lyotropic Liquid Crystalline Compound)

The lyotropic liquid crystalline compound used in the present invention can be used without any particular limitation as long as it can be applied on a base material and can form an applied film after being dried. The lyotropic liquid crystalline compound may be a material that will be a retardation element after the film is formed, or may be a material that will be a polarizing element after the film is formed.

The above lyotropic liquid crystalline compound is preferably a polycyclic compound. The polycyclic compound has two or more of aromatic rings and/or heterocyclic rings, and preferably has four to eight of aromatic rings and/or heterocyclic rings. Also, it is preferable that the fundamental skeleton of the polycyclic compound has at least a heterocyclic ring, and it is more preferable that the heterocyclic ring has a nitrogen atom. Further, the lyotropic liquid crystalline compound preferably has —$SO_3M$ and/or —COOM in its molecular structure (wherein M is the same as in the following general formula (I)).

(Lyotropic Liquid Crystalline Compound that Forms a Retardation Element)

In the case where the above lyotropic liquid crystalline compound is a material that can form a retardation element, the lyotropic liquid crystalline compound preferably contains a quinoxaline derivative unit in a molecular structure. The lyotropic liquid crystalline compound more preferably contains an acenaphtho[1,2-b]quinoxaline derivative unit in a molecular structure, and most preferably contains an acenaphtho[1,2-b]quinoxaline derivative unit having at least one of —$SO_3M$ and —COOM in a molecular structure.

The above quinoxaline derivative includes an acenaphtho[1,2-b]quinoxaline derivative represented by the following general formula (I). In the formula (I), k and l are each independently an integer from 0 to 4; m and n are each independently an integer from 0 to 6; and M represents a counter ion. In this regard, k, l, m, and n are not simultaneously 0.

The above M is preferably a hydrogen atom, an alkali metal atom, an alkaline earth metal atom, a metal ion, or a substituted or unsubstituted ammonium ion. The metal ion include, for example, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, $Ce^{3+}$, or the like.

[chemical formula 2]

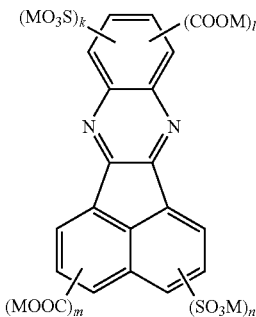

(I)

The above acenaphtho[1,2-b]quinoxaline derivative can be obtained, for example, by sulfonation of acenaphtho[1,2-b]quinoxaline or carboxylic acid thereof with sulfuric acid, fuming sulfuric acid, chlorosulfonic acid, or the like as shown in the following formula (a). In the formula (a), k, l, m, n, and M are similar to those in the general formula (I) (in this regard, k and n are not simultaneously 0).

[chemical formula 3]

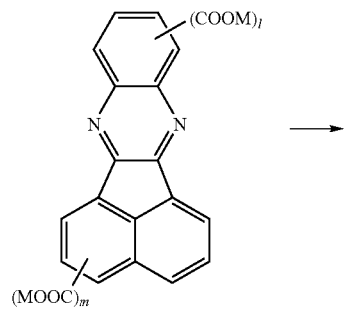

(a)

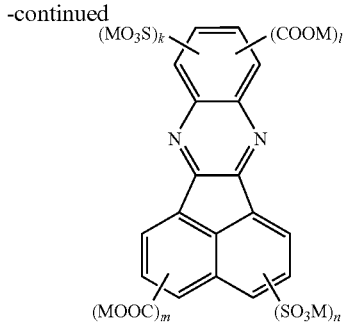

Also, the above acenaphtho[1,2-b]quinoxaline derivative can be obtained, for example, by condensation reaction of sulfo and/or carboxy derivative of benzene-1,2-diamine with sulfo and/or carboxy derivative of acenaphthoquinone as shown in the following formula (b). In the formula (b), k, l, m, n, and M are similar to those in the general formula (I) (in this regard, k, l, m, and n are not simultaneously 0).

[chemical formula 4]

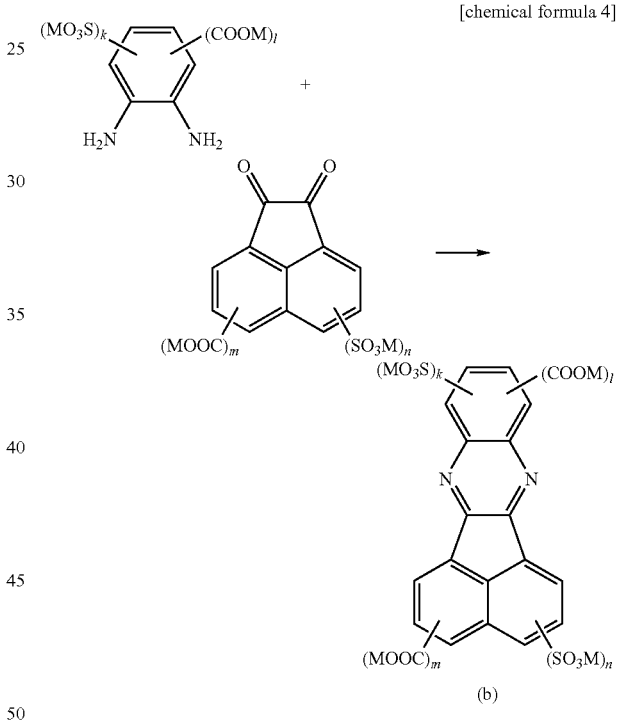

(b)

The above acenaphtho[1,2-b]quinoxaline derivative exhibits a liquid crystal phase (namely, lyotropic liquid crystal) in a solution state of a predetermined concentration. Here, this liquid crystal phase is preferably a nematic liquid crystal phase in view of being excellent in orientation property. This nematic liquid crystal phase includes those that form a super molecule and whose formation is in a nematic state.

A retardation element can be fabricated by forming a film from a solution containing the above acenaphtho[1,2-b]quinoxaline derivative. By using the above acenaphtho[1,2-b]quinoxaline derivative, a transparent retardation element having a high in-plane birefringence and having no or little absorption in the visible light region can be fabricated.

The thickness of the retardation element obtained by forming a film from the above solution can be reduced because it is fabricated by application. Further, the retardation element of the present invention is such that the refractive index ellipsoid satisfies a relationship of $nx \geq nz > ny(nx > nz > ny$ or $nx = nz > ny)$, and also exhibits a high in-plane birefringence. For this reason, with the retardation element of the present invention, a desired retardation value can be obtained with an outstandingly small thickness as compared with the conventional retardation element. Here, in the present specification, "nx=nz" includes a case in which nx and nz are substantially identical in addition to a case in which nx and nz are completely identical. The case in which nx and nz are substantially identical refers, for example, to a case in which Rth[590] is from −10 nm to 10 nm, preferably from −5 nm to 5 nm.

Here, in the present specification, "nx" and "ny" represent the refractive indices in directions that are perpendicular to each other in a plane (here, nx ny), and "nz" represents the refractive index in vertical direction relative to the plane.

The transmittance of the above retardation element at the wavelength of 590 nm is preferably 85% or higher, more preferably 90% or higher. The thickness of the retardation element is preferably from 0.05 μm to 5 μm, more preferably from 0.1 μm to 5 μm.

The in-plane birefringence of the retardation element at the wavelength of 590 nm ($\Delta n_{xy}[590]=nx-ny$) is preferably 0.01 or larger, more preferably 0.05 or larger, most preferably from 0.1 to 0.5. Here, the above $\Delta n_{xy}[590]$ can be suitably adjusted within the above range by the molecular structure of the polycyclic compound.

The in-plane retardation value of the above retardation element at the wavelength of 590 nm (Re[590]) can be set to be a suitable value in accordance with an object. The above Re[590] is 10 nm or larger, preferably from 20 nm to 300 nm. Here, the in-plane retardation value (Re[λ]) refers to the retardation value within the plane of a retardation element at the wavelength of λ (nm) at 23° C. The Re[λ] can be determined by Re[λ]=(nx−ny)×d, where the thickness of the retardation element is d (nm).

The Rth[590] of the above retardation element can be set to be a suitable value within a range in which the refractive index ellipsoid satisfies the relationship of $nx \geq nz \geq ny$. The difference between the in-plane retardation value (Re[590]) and the thickness direction retardation value (Rth[590]) of the retardation element at the wavelength of 590 nm (Re[590]−Rth[590]) is preferably from 10 nm to 200 nm, more preferably from 20 nm to 200 nm. Here, the thickness direction retardation value (Rth[λ]) refers to the thickness direction retardation value of a retardation element at the wavelength of λ (nm) at 23° C. The Rth[λ] can be determined by Rth[λ]=(nx−nz)×d, where the thickness of the retardation element is d (nm).

The Nz coefficient of the above retardation element is preferably from −0.1 to 0.9, more preferably from 0 to 0.9, most preferably from 0.1 to 0.7. When the Nz coefficient is within the above range, the retardation element can be used for optical compensation of liquid crystal cells in various driving modes. Here, the Nz coefficient is a value calculated from Rth[590]/Re[590].

Also, the wavelength dispersion value (D) of the above retardation element is preferably 1.05 or larger, more preferably from 1.06 to 1.15. Here, the wavelength dispersion value (D) is a value calculated from the formula; D=Re[480]/Re[550].

(Lyotropic Liquid Crystalline Compound that Forms a Polarizing Element)

In the case where the above lyotropic liquid crystalline compound is a material that forms a polarizing element, the lyotropic liquid crystalline compound preferably contains an azo derivative unit, an anthraquinone derivative unit, a perylene derivative unit, an indanthrone derivative unit, and/or an imidazole derivative unit in its molecular structure.

Also, for the lyotropic liquid crystalline compound that forms a polarizing element, it is preferable to use a lyotropic liquid crystalline dichroic dye represented by the following general formula (1).

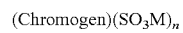

(Chromogen)(SO₃M)ₙ      Formula (1)

(wherein M represents a cation)

In the formula (1), M is preferably a hydrogen ion, an ion of metal of group I such as Li, Na, K or Cs, or an ammonium ion.

Further, a chromogen moiety preferably includes an azo derivative unit, an anthraquinone derivative unit, a perylene derivative unit, an indanthrone derivative unit, and/or an imidazole derivative unit.

As for the dichroic dye represented by the general formula (1), the chromogen, such as an azo compound and polycyclic compound structure, becomes a hydrophobic moiety in the solution, and sulfonic acid and a salt of sulfonic acid become a hydrophilic moiety in the solution. With the balance of the hydrophobic and hydrophilic moieties, the hydrophobic moieties and the hydrophilic moieties are respectively combined to develop a lyotropic liquid crystalline phase.

A particular example of the dichroic dye represented by the general formula (1) is compounds represented by the following general formulas from (2) to (8).

[chemical formula 5]

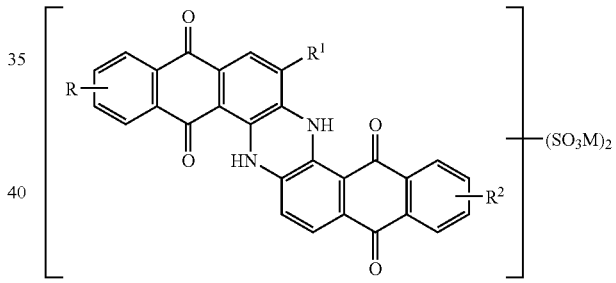

(2)

In the general formula (2), R¹ represents hydrogen or chlorine, R² and R represent hydrogen, an alkyl group, ArNH or ArCONH. The alkyl group has preferably a carbon number of 1 to 4, and a methyl group or an ethyl group is more preferable. An aryl group (Ar) is preferably a substituted or unsubstituted phenyl group, and a phenyl group which is unsubstituted or substituted with chlorine at the 4-position is more preferable. M is as defined in the above general formula (1).

[chemical formula 6]

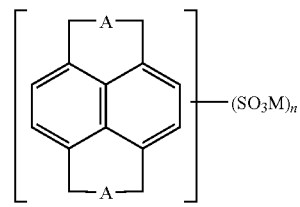

(3)

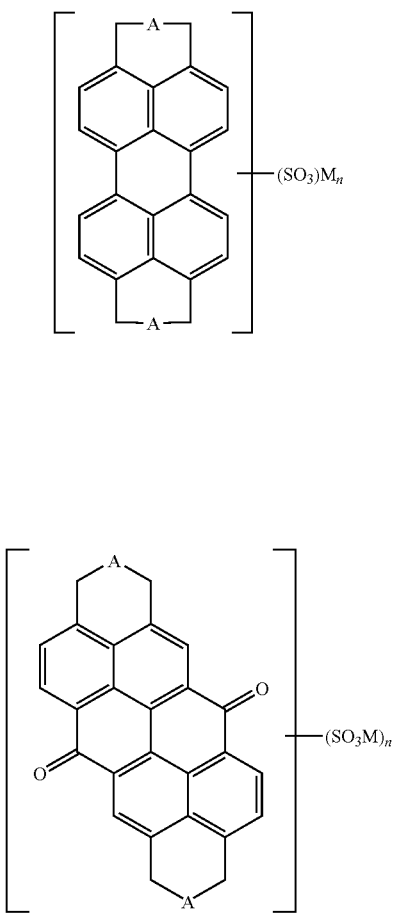

(4)

(5)

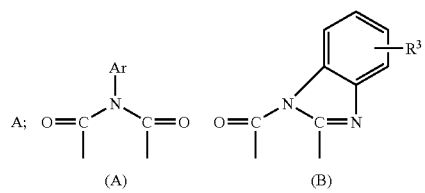

In the general formulas from (3) to (5), A is represented by the formula (A) or (B), and n is 2 or 3. $R^3$ of formula (B) represents hydrogen, an alkyl group, halogen, or an alkoxy group, and Ar of formula (A) represents a substituted or unsubstituted aryl group. The alkyl group preferably has 1 to 4 carbon number, and a methyl group or an ethyl group is more preferable. Halogen is preferably bromine or chlorine. Further, the alkoxy group preferably has 1 or 2 carbon number, and a methoxy group is more preferable. The aryl group is preferably a substituted or unsubstituted phenyl group, and a phenyl group which is unsubstituted, or substituted with a methoxy group, ethoxy group, chlorine or a butyl group at the 4-position, or substituted with a methyl group at the 3-position is more preferable. M is as defined in the above general formula (1).

[chemical formula 7]

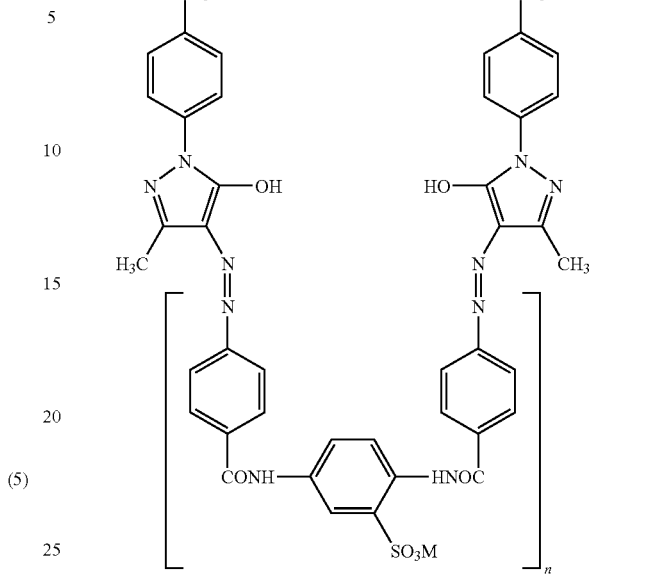

(6)

In the general formula (6), n is an integer from 3 to 5, and M is as defined in the general formula (1).

[chemical formula 8]

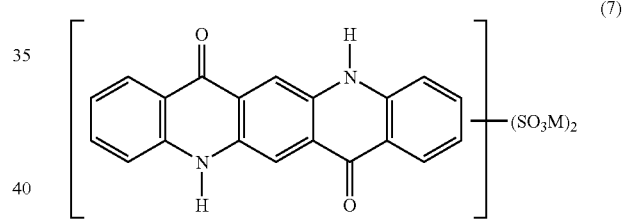

(7)

In the general formula (7), M is as defined in the above general formula (1).

[chemical formula 9]

(8)

In the general formula (8), M is as defined in the above general formula (1).

A polarizing element can be fabricated by forming a film from a solution containing the above lyotropic liquid crystalline compound. With use of the above lyotropic liquid crystalline compound, a polarizing element having a high polarization degree can be fabricated.

The thickness of the polarizing element obtained by forming a film from the above solution can be reduced because it is fabricated by application.

The polarization degree of the obtained polarizing element is preferably 99% or more, more preferably 99.5% or more. Also, the single-body transmittance of the polarizing element is preferably 40% or more, more preferably 42% or more.

<Method of Producing an Optical Laminate of the Present Invention>

The method of producing an optical laminate of the present invention preferably includes the following step A to step C.

Step A: the step of applying a solution containing at least one kind of a lyotropic liquid crystalline compound on a base material to form a wet applied film.

Step B: the step of drying the wet applied film by spraying a wind onto the surface of the wet applied film simultaneously with the step A or after performing the step A and before the wet applied film is dried.

Step C: the step of bringing the surface of the applied film dried in the step B into contact with a solution containing at least one kind of a compound salt selected from the group consisting of aluminum salts, barium salts, lead salts, chromium salts, strontium salts, and compound salts having two or more amino groups in a molecule.

(Step A)

The step A is a step of applying the solution containing the lyotropic liquid crystalline compound on the above base material so as to form a wet applied film on the base material. For the base material, those exemplified above can be used.

The solution containing the lyotropic liquid crystalline compound used in the step A (which may hereafter referred to as "liquid crystalline solution") contains one or more kinds of the above lyotropic liquid crystalline compounds and a solvent. The solvent preferably contains water. The lyotropic liquid crystalline compound can be suitably selected from those exemplified above, and can be used alone or two or more kinds. The concentration of the lyotropic liquid crystalline compound in the liquid crystalline solution can be suitably set to be an appropriate value in accordance with the kind of the coater used at the time of application or the thickness of the wet applied film. The concentration of the lyotropic liquid crystalline compound in the liquid crystalline solution is preferably from 2 to 40% by mass, more preferably from 5 to 30% by mass. Also, viscosity of the liquid crystalline solution is preferably from 0.1 to 500 mPa·s, more preferably from 1 to 100 mPa·s. In this regard, the viscosity is a value measured by a rheometer [manufactured by Haake Co., Ltd., product name: RHEOSTRESS 600. Measurement condition: double cone sensor shear rate 1000 (1/s)].

In the case of using water as a solvent of the liquid crystalline solution, electric conductivity of water is preferably 20 μS/cm or below (lower limit of 0 μS/cm), more preferably from 0.001 to 10 μS/cm, and most preferably from 0.01 to 5 μS/cm. By using a solution in which the electric conductivity of water is within the above-range, an applied film being excellent in uniformity can be formed. Here, the electric conductivity can be measured by using a solution electric conductivity meter [Kyoto Electronics Manufacturing Co., Ltd., product name: CM-117].

Here, the above liquid crystalline solution may contain other arbitrary suitable solvents in addition to water as a solvent. The above solvents include, for example, alcohols, ethers, esters, ketones, cellosolves, and the like. These solvents may be used alone or in combination with two or more kinds.

Also, the above liquid crystalline solution is preferably adjusted to have a pH value of about form 4 to 10, more preferably a pH value of about from 6 to 8.

Further, into the above liquid crystalline solution, an additive may be added. Examples of the additive include a plasticizer, a thermal stabilizer, an optical stabilizer, a lubricant, an antioxidant, an ultraviolet absorber, a flame retardant, a coloring agent, an antistatic agent, a compatibility improving agent, a cross-linking agent, and a thickening agent. The amount of addition of these additives is preferably larger than 0 and 10% by mass.

Further, a surfactant may be added to the liquid crystalline solution. The surfactant is used for improving the wettability and the application property of the polycyclic compound onto the base material surface. As the surfactant, a nonionic surfactant is preferably used. The amount of addition of the surfactant is preferably larger than 0 and smaller than 5% by mass.

As a method of applying the liquid crystalline solution on one surface of the base material, an applying method using a proper coater is properly used. The coater is, for example, a reverse roll coater, a positive rotation roll coater, a gravure coater, a rod coater, a slot die coater, a slot orifice coater, a curtain coater, or a fountain coater.

In the present specification, the "wet applied film" refers to the applied film formed on the base material and not dried yet. Specifically, the wet applied film includes those from a state immediately after the above liquid crystalline solution is thinly developed on the base material to a state immediately before the wet applied film is dried and solidified. The wet applied film preferably has a solid component concentration of from 2 to 95% by mass, more preferably the wet applied film has a solid component concentration of from 2 to 90% by mass.

The thickness of the wet applied film is not particularly limited; however, it is typically from 1 to 100 μm.

(Step B)

The step B is a step of spraying wind onto the surface of the wet applied film so as to dry the film.

The spraying of wind is performed before the wet applied film is dried. Specifically, the spraying of wind is carried out simultaneously with the step A or after performing the step A and before the wet applied film is completely dried. The term "simultaneously with the step A" includes a meaning of spraying the wind in parallel with the application operation while applying the above liquid crystalline solution on the base material. The term "after performing the step A and before the wet applied film is completely dried" includes a meaning of spraying the wind immediately after the wet applied film is formed by application of the above liquid crystalline solution on the base material and, in addition, includes a meaning of spraying the wind after the wet applied film is formed and before the wet applied film is naturally dried.

For example, the spraying of wind is performed simultaneously with the step A or within two minutes from immediately after the step A, preferably simultaneously with the step A or within one minute from immediately after the step A.

In the present specification, the term "wind" refers to a stream of gas. The major component of the wind may be air or a specific gas such as oxygen, nitrogen, or helium.

The temperature of the above wind (the temperature of the wind on the wet applied film surface) is not particularly limited; however, it is preferably from 0 to 80° C., more preferably from 20 to 60° C.

The above wind is sprayed toward the surface of the wet applied film 31 as shown in FIG. 2.

Figure 2A:
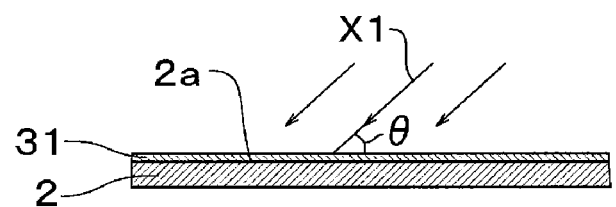
FIG. 2A is a reference cross-sectional view showing the wind direction.

As shown in FIG. 2A, the direction X1 of the wind as viewed from the base material side surface (which is referred to as "wind direction in a side view") is not particularly limited, so that it may be a tilted direction relative to the plane 2a of the base material 2 or may be a vertical direction relative to the plane 2a of the base material 2. Preferably, the wind direction X1 in a side view is a direction such that the angle θ relative to the plane 2a of the base material 2 will be an acute angle, more preferably such that the above angle θ exceeds 0° and is below or equal to 60°, and particularly preferably such that the angle θ exceeds 0° and is below or equal to 30°. This is because, when the angle θ is within the above range, the surface of the applied film 31 is hardly disturbed even if the wind flow rate changes, whereby an applied film having a high surface uniformity can be obtained.

Figure 2B:
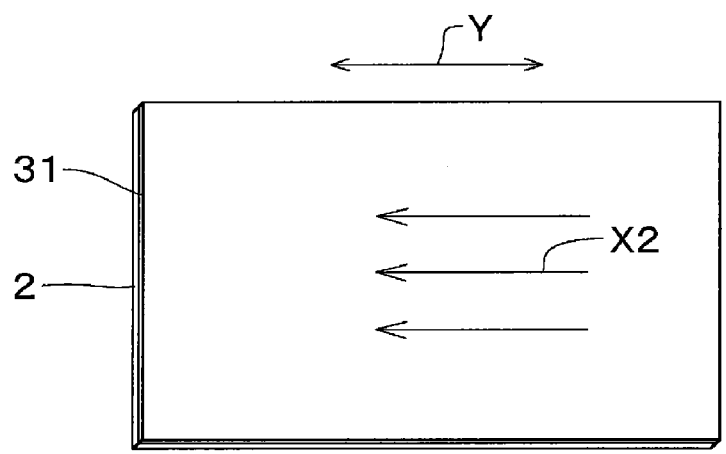
FIG. 2B is a reference plan view showing the wind direction.

Further, the direction of the wind viewed from the base material plane (which is referred to as "wind direction in a plan view") is not particularly limited, and it can be arbitrarily set. Preferably, as shown in FIG. 2B, the wind direction X2 in a plan view is a direction approximately identical to the direction Y of applying the above solution.

Also, the flow rate of the above wind is preferably from 1 to 100 liter/minute per 100 cm² of the wet applied film, more preferably from 5 to 50 liter/minute per 100 cm² of the wet applied film.

The wind speed of the above wind is preferably from 0.2 to 10 m/second, more preferably 3 to 8 m/second.

The period of time for spraying the above wind is preferably from 2 seconds to 10 minutes, more preferably from 10 seconds to 10 minutes.

This is because, when the wind flow rate and/or the wind speed and/or the spraying time satisfies the above-described condition, the surface of the applied film will not be disturbed, and the wet applied film can be dried in a short period of time.

The means for generating the wind is not particularly limited, so that arbitrary suitable means such as a drier or a wind sending machine can be adopted.

The drying is preferably carried out until the wet applied film is solidified. Nevertheless, in the production method of the present invention, arbitrary drying means such as a drying oven or a heat roll may be performed to complete drying after the applied film is dried by spraying the wind as described above.

By drying the wet applied film in the above manner, an applied film in a state of having been dried and solidified on the base material (hereafter, the applied film after being dried may be referred to as "dried applied film") can be formed.

The dried applied film preferably has a solid component concentration of 90% by mass or higher, more preferably 95% by mass or higher.

The production method of the present invention includes spraying wind onto the wet applied film, so that the applied film can be prevented from becoming white turbidity in the drying process. Also, depending on the wind direction, the orientation direction of the lyotropic liquid crystalline compound can be changed, or the orientation property of the lyotropic liquid crystalline compound can be enhanced.

For example, by setting the wind direction in the above plan view to be a direction approximately identical to the direction of applying the solution, the orientation property of the lyotropic liquid crystalline compound can be enhanced. On the other hand, by setting the wind direction in the above plan view to be a direction not parallel to the direction of applying the solution, the orientation direction of the lyotropic liquid crystalline compound can be changed.

(Step C)

The step C is a step of imparting water resistance to the surface of the dried applied film (the surface opposite to the bonded surface of the base material).

Specifically, the surface of the dried applied film formed in the above step B is brought into contact with a solution containing at least one kind of a compound salt selected from the group consisting of aluminum salt, barium salt, lead salt, chromium salt, strontium salt, and compound salts having two or more amino groups within a molecule.

Examples of the above compound salt include aluminum chloride, barium chloride, lead chloride, chromium chloride, strontium chloride, 4,4'-tetramethyldiaminodiphenylmethane hydrochloride, 2,2'-dipyridyl hydrochloride, 4,4'-dipyridyl hydrochloride, melamine hydrochloride, tetraminopyrimidine hydrochloride, and the like. By forming a layer of such a compound salt on the dried applied film surface, the surface of the dried applied film can be made insoluble or slightly soluble to water. Therefore, water resistance can be imparted to the dried applied film.

In the solution containing the above compound salt, the concentration of the compound salt is preferably from 3% to 40% by mass, more preferably from 5% to 30% by mass.

As a method of bringing the solution containing the above compound salt into contact with the surface of the above dried applied film, one can adopt, for example, a method of applying the solution containing the above compound salt onto the surface of the dried applied film, a method of immersing the dried applied film into the solution containing the above compound salt, or the like. In the case that these methods are adopted, the surface of the dried applied film is preferably dried in advance after being washed with water or an arbitrary solvent.

<Use of the Optical Laminate>

The usage of the optical laminate of the present invention is not particularly limited; however, it is representatively used as an optical member (λ/4 plate, λ/2 plate, viewing angle enlarging film, polarizing film or the like) of a liquid crystal displaying apparatus.

In one embodiment, when the optical laminate of the present invention is a retardation element, a polarizing element may be laminated thereon for use as a polarizing plate. Hereinafter, this polarizing plate will be described.

The above polarizing plate includes at least the optical laminate of the present invention and a polarizing element. This polarizing plate may include other optical laminates, other retardation elements, arbitrary protective layers, and the like. For practical use, an arbitrary suitable adhesive layer is disposed between the layers of the constituent members of the above polarizing plate, whereby each layer is adhered to each other.

The polarizing element is an optical member having a function of converting a natural light or a polarized light into a linearly polarized light. As the polarizing element, an arbitrary suitable one can be adopted. As the above polarizing element, a stretched film having, as a major component, a polyvinyl alcohol type resin containing iodine or a dichroic dye is preferably used. The thickness of the above polarizing element is typically from 5 μm to 50 μm.

As the above adhesive layer, an arbitrary suitable one can be selected as long as it adheres and integrates the surfaces of adjacent members with a practically sufficient adhering strength and a adhering time. Examples of the material for forming the above adhesive layer include a adhesive agent, a pressure-sensitive adhesive agent, and an anchor coat agent. The above adhesive layer may be a multiple-layer structure in which an anchor coat agent layer is formed on a surface of a body, and a adhesive layer or a pressure-sensitive adhesive layer is formed thereon, or may be a thin layer (also referred to as a hair line) that is unrecognizable by a naked human eye. The adhesive layer disposed on one side of the optical laminate and the adhesive layer disposed on the other side may be the same or may be different from each other.

In another embodiment, when the optical laminate of the present invention is a polarizing element, a retardation element may be laminated thereon for use as a polarizing plate. This polarizing plate may include other optical laminates, other retardation elements, arbitrary protective layers, and the like as well.

The usage of the optical laminate of the present invention is not particularly limited, the optical laminate can be used as an optical member of various image displaying apparatus preferably.

The image displaying apparatus of the present invention includes an organic EL display, a plasma display, and others in addition to a liquid crystal displaying apparatus. A preferable use of the image displaying apparatus is a television set (particularly a large-scale television set having a screen size of 40 inches or more). In the case that the image displaying apparatus is a liquid crystal displaying apparatus, preferable uses thereof are OA apparatus such as a personal computer monitor, a notebook personal computer, and a copying machine; portable apparatus such as a portable telephone, a clock, a digital camera, a portable digital assistance (PDA), and a portable game machine; a home-use electric apparatus such as a video camera and an electronic range; apparatus to be mounted on a vehicle such as a back monitor, a monitor for a car navigation system, and a car audio device; an exhibition apparatus such as an information monitor for commercial shops; guarding apparatus such as a monitor for supervision; and assisting and medical apparatus such as a monitor for assisting senior persons and a monitor for medical use.

EXAMPLES

The present invention will be further described with use of the Examples and the Comparative Examples. Here, the present invention is not limited solely to the following Examples. Here, each of the analyzing method used in the Examples is as follows.

(1) Thickness Measurement Method:

When the thickness was less than 10 µm, the measurement was made with use of a spectrophotometer for thin films [manufactured by Ohtsuka Electronics Co., Ltd., product name: "Instantaneous Multi Photometry System MCPD-2000"]. When the thickness was above or equal to 10 µm, the measurement was made with use of a digital micrometer manufactured by Anritsu Co., Ltd., [KC-351C type].

(2) Method of Measurement of nx, ny, nz, Re[590], Rth[590], and Nz Coefficient:

With use of the trade name "KOBRA21-ADH" manufactured by Ohji Scientific Instruments Ltd., nx, ny, nz, Re[590], Rth[590], and Nz coefficient were measured at 23° C. Here, as the average refractive index, a value obtained by measurement with use of Abbe refractometer (manufactured by Atago Ltd., product name: "DR-M4") was used.

(3) Method of Measurement of Single-Body Transmittance and Polarization Degree:

With use of a spectrophotometer [manufactured by Murakami Color Research Laboratory Co., Ltd., product name: "DOT-3"], measurement was made under the condition of 23° C. Here, for the measured values of the polarization degree and the single-body transmittance, the wavelength of 550 nm was used as a standard.

The single-body transmittance is a Y value of tristimulus value based on the two-degree field of JIS Z 8701-1995.

The polarization degree can be calculated by measuring parallel transmittance ($H_0$) and orthogonal transmittance ($H_{90}$) and using the formula: polarization degree (%)=$\{(H_0-H_{90})/(H_0+H_{90})\}^{1/2} \times 100$. The parallel transmittance ($H_0$) is a value of the transmittance of a parallel-type laminate fabricated by laminating two of the optical laminates that are measurement object such that the absorption axes thereof will be parallel to each other. The orthogonal transmittance ($H_{90}$) is a value of the transmittance of an orthogonal-type laminate fabricated by laminating two of the optical laminates that are measurement object such that the absorption axes thereof will be orthogonal to each other. Here, these transmittances are Y values subjected to vision sensitivity correction by the two-degree field (C light source) of JIS Z 8701-1982.

Synthesis Example 1

Synthesis of acenaphtho[1,2-b]quinoxaline

To a reaction vessel equipped with a stirrer, 5-liter of glacial acetic acid and 490 g of purified acenaphthenequinone were added and stirred for 15 minutes under nitrogen bubbling to obtain an acenathphenequinone solution. Similarly, to another reaction vessel equipped with a stirrer, 7.5-liter of glacial acetic acid and 275 g of o-phenylenediamine were added and stirred for 15 minutes under nitrogen bubbling to obtain an o-phenylenediamine solution. Thereafter, while stirring under nitrogen atmosphere, the o-phenylenediamine solution was added to the acenaphthenequinone solution gradually over one hour, and then allowed to react by continuing to stir for 3 hours. After ion exchange water was added to the obtained reaction liquid, the precipitate was filtrated to obtain a crude product. This crude product was recrystallized with a heated glacial acetic acid for purification.

Synthesis Example 2

Synthesis of acenaphtho[1,2-b]quinoxaline-2,5-disulfonic Acid

As represented by the following reaction pathway, after 30% fuming sulfuric acid (2.1-liter) was added to 300 g of acenaphtho[1,2-b]quinoxaline obtained by synthesis example 1 and the mixture was stirred at room temperature for 24 hours, the resultant was heated to 130° C. and stirred for 32 hours for reaction. While keeping the obtained solution at 40° C. to 50° C., 4.5-liter of ion exchange water was added for dilution, and the resultant was further stirred for 3 hours. The precipitate was filtered and recrystallized with sulfuric acid to obtain acenaphtho[1,2-b]quinoxaline-2,5-disulfonic acid as represented by the following formula (c).

This reaction product was dissolved in 30-liter of ion exchange water (electric conductivity: 0.1 µS/cm) and further was neutralized by addition of an aqueous solution of sodium hydroxide. The obtained aqueous solution was put into a supply tank and, with use of a high-pressure RO element testing apparatus equipped with a reverse osmosis filter manufactured by Nitto Denko Corporation [trade name: "NTR-7430 filter element"], was subjected to circulation filtration while adding a reverse osmosis water so that the liquid amount would be constant, thereby removing the residual sulfuric acid until the electric conductivity of the exhaust liquid would be 13.6 µS/cm.

[chemical formula 11]

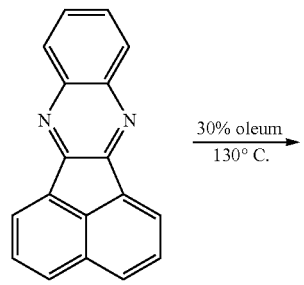

30% oleum
———————→
130° C.

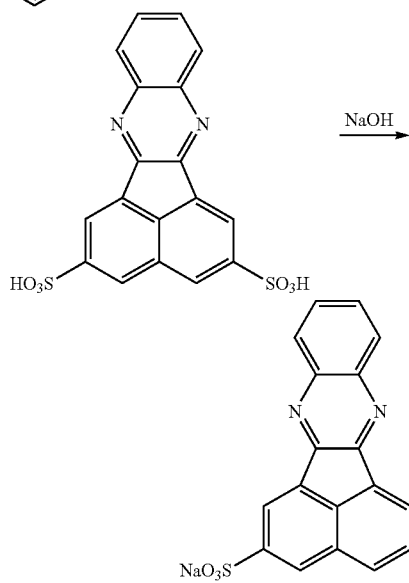

NaOH
———→

[chemical formula 12]

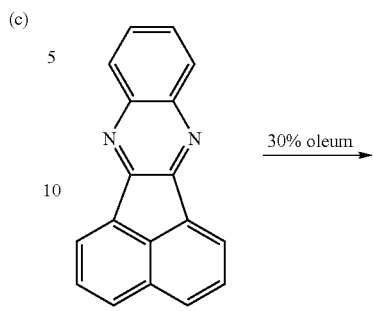

30% oleum
———————→

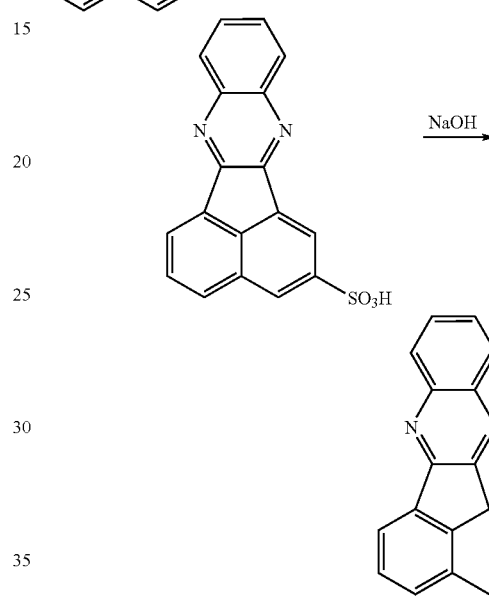

NaOH
———→

Synthesis Example 3

Synthesis of acenaphtho[1,2-b]quinoxaline-2-sulfonic Acid

As represented by the following reaction pathway, 30% fuming sulfuric acid (2.1-liter) was added to 300 g of acenaphtho[1,2-b]quinoxaline obtained by synthesis example 1 and the mixture was stirred at room temperature for 48 hours for reaction. While keeping the obtained solution at 40° C. to 50° C., 4.5-liter of ion exchange water was added for dilution, and the resultant was further stirred for 3 hours. The precipitate was filtered to obtain acenaphtho[1,2-b]quinoxaline-2-sulfonic acid as represented by the following formula (d).

This reaction product was dissolved in 30-liter of ion exchange water (electric conductivity: 0.1 μS/cm) and further was neutralized by addition of an aqueous solution of sodium hydroxide. The obtained aqueous solution was put into a supply tank and, with use of a high-pressure RO element testing apparatus equipped with a reverse osmosis filter manufactured by Nitto Denko Corporation [trade name: "NTR-7430 filter element"], was subjected to circulation filtration while adding a reverse osmosis water so that the liquid amount would be constant, thereby removing the residual sulfuric acid until the electric conductivity of the exhaust liquid would be 8.1 μS/cm.

Preparation of a Liquid Crystalline Solution

Preparation of an Aqueous Solution of a Mixture of acenaphtho[1,2-b]quinoxaline-2,5-disulfonic Acid and acenaphtho[1,2-b]quinoxaline-2-sulfonic Acid The aqueous solutions obtained in the above synthesis example 2 and synthesis example 3 were mixed so that the mixing ratio of the solid components of the acenaphtho[1,2-b]quinoxaline-2,5-disulfonic acid obtained in the above synthesis example 2 and the acenaphtho[1,2-b]quinoxaline-2-sulfonic acid obtained in the above synthesis example 3 would be 65 mass parts: 35 mass parts. Next, an liquid crystalline solution was prepared from this aqueous solution with use of a rotary evaporator so that the concentration of the aforesaid quinoxaline compounds (sum of the two kinds) in the aqueous solution would be 25% by mass. Here, when observed with a polarization microscope, this solution exhibited a nematic liquid crystal phase at 23° C.

Example 1

The solution obtained by preparation of the above liquid crystalline solution was applied with a slide-type coater on a glass substrate [manufactured by Matsunami Glass Industry Ltd., Micro Slide Glass product number S] to form a wet applied film having a thickness of 5 μm. Immediately after this wet applied film was formed, wind was sprayed onto the surface of the wet applied film under the following wind condition to dry the applied film, thereby fabricating an optical laminate in which a dried applied film was laminated on a base material.

Direction of wind: the direction which is tilted by 5° relative to the base material and which is parallel to the direction of applying the liquid crystalline solution.

Wind flow rate: 10 liter/minute onto the wet applied film surface.

Time: 5 minutes.

Wind temperature: 25° C. (temperature on the wet applied film surface).

The obtained dried applied film had a thickness of 0.6 μm. When this dried applied film was observed visually, the dried applied film had no white turbidity and was transparent.

Next, when the above optical laminate was observed by being sandwiched between two sheets of polarizing plates arranged in crossed nicol, the dried applied film had a uniform retardation. This dried applied film is a retardation element, and the refractive index ellipsoid thereof exhibited a relationship of nx>nz>ny.

Also, the single-body transmittance of the dried applied film at the wavelength of 590 nm was 99.1%; the in-plane retardation value at the wavelength of 590 nm (Re[590]) was 186.7 nm; the thickness direction retardation value at the wavelength of 590 nm (Rth[590]) was 50.4 nm; and the Nz coefficient (Rth[590]/Re[590])=0.27.

Example 2

A wet applied film having a thickness of 5 μm was formed in the same manner as in the Example 1 except that an aqueous solution containing several kinds of lyotropic liquid crystalline compounds [manufactured by Optiva Co., Ltd., trade name: "N15"] was used as the liquid crystalline solution. Here, the lyotropic liquid crystalline compound in this aqueous solution is a mixture of an imidazole derivative having —$SO_3Na$ as a substituent, a perylene derivative having —$SO_3Na$ as a substituent, and an indanthrone derivative having —$SO_3Na$ as a substituent.

Immediately after this wet applied film was formed, wind was sprayed onto the surface of the wet applied film under the following wind condition to dry the applied film, thereby fabricating an optical laminate in which a dried applied film was laminated on a base material.

Direction of wind: the direction which is tilted by 10° relative to the base material and which is parallel to the direction of applying the liquid crystalline solution.

Wind flow rate: 20 liter/minute onto the wet applied film surface.

Time: 5 minutes.

Wind temperature: 25° C. (temperature on the wet applied film surface).

The obtained dried applied film had a thickness of 0.4 μm. When this dried applied film was observed visually, the dried applied film had no white turbidity and was transparent.

Next, when the above optical laminate was observed by being sandwiched between two sheets of polarizing plates arranged in crossed nicol, the dried applied film had an absorption axis and a transmittance axis that were uniform. This dried applied film is a polarizing element; the single-body transmittance of the dried applied film at the wavelength of 600 nm was 36.7%; and the polarization degree at the wavelength of 600 nm (P[600]) was 99.2%.

Comparative Example 1

An optical laminate including a base material and a dried applied film was fabricated in the same manner as in the Example 1 except that the wet applied film was dried by being put into a thermostatic and humidistatic oven of 24° C. and 60% RH for 10 minutes without spraying the wind. When the obtained dried applied film was observed visually, the dried applied film became white turbidity, so that it was unsuitable for optical usage.

Comparative Example 2

An optical laminate including a base material and a dried applied film was fabricated in the same manner as in the Example 1 except that the wet applied film was naturally dried by being left to stand under room temperature after the wet applied film was formed and that the wind was sprayed onto the applied film surface under the same wind condition as in the Example 1 after the dried applied film was formed (after three minutes from immediately after the solution application). When the obtained dried applied film was observed visually, the dried applied film became white turbidity, so that it was unsuitable for optical usage.

Evaluation

Figure 3:
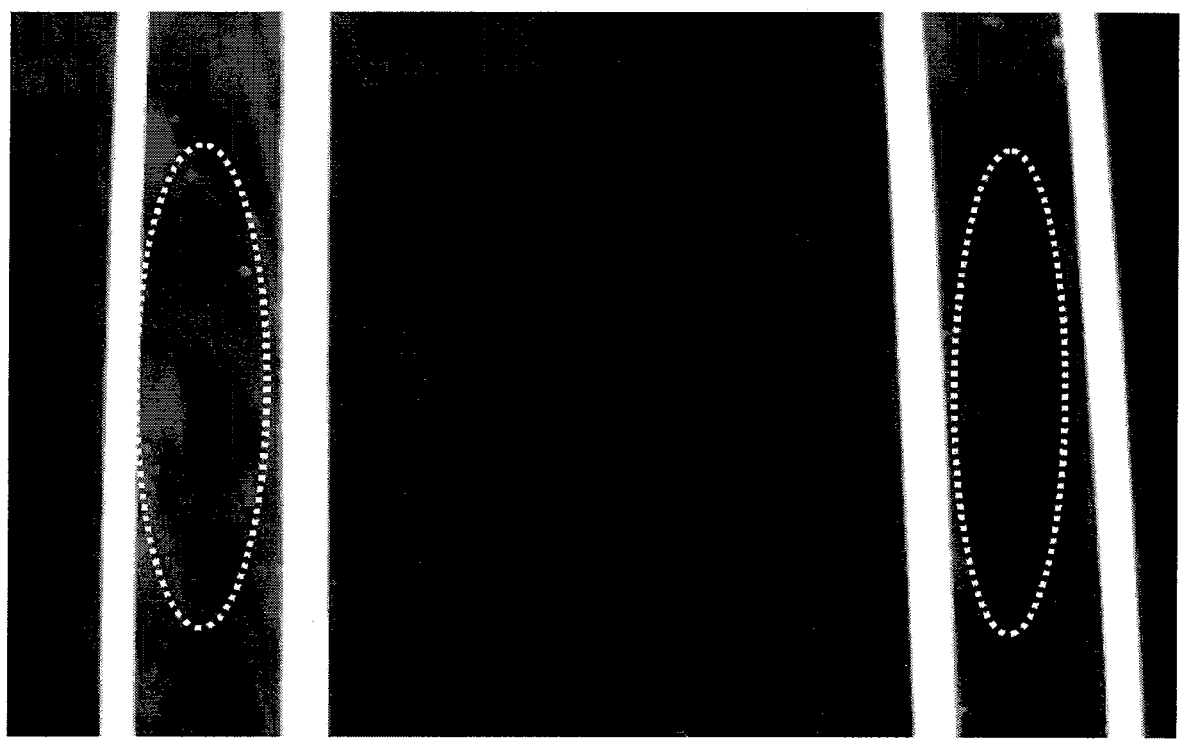
FIG. 3 is a photograph view of the optical laminates of Example 1 and Comparative Example 1.

The optical laminates obtained in the Example 1 and the Comparative Example 1 were sandwiched between two sheets of polarizing plates arranged in crossed nicol to take photographs. The result is shown in FIG. 3. In FIG. 3, the right side shows an optical laminate of the Example 1, and the left side shows an optical laminate of the Comparative Example 1. The parts respectively enclosed by broken lines were evaluated. As will be clear from FIG. 3, the optical laminate of the Example 1 had no white turbidity, whereas the optical laminate of the Comparative Example 1 had generated a white turbidity. However, the outside of the broken line in FIG. 3 corresponds to the outside of the application head of the coater, and the thickness of the wet applied film is not controlled, so that a white band-shaped trace has been photographed.

What is claimed is:

1. A method of producing an optical laminate having a base material and an applied film laminated on at least one surface of the base material and containing a lyotropic liquid crystalline compound, comprising:

a step A of applying a solution containing at least one kind of a lyotropic liquid crystalline compound on a base material to form a wet applied film; and a step B of drying the wet applied film by spraying a wind onto the surface of the wet applied film simultaneously with the step A or after performing the step A and before the wet applied film is dried;

wherein the wind is sprayed from a tilted direction relative to a plane of the base material and a parallel direction relative to a direction of applying the solution.

2. The method of producing an optical laminate according to claim 1, wherein the lyotropic liquid crystalline compound contains a polycyclic compound represented by the following formula (I):

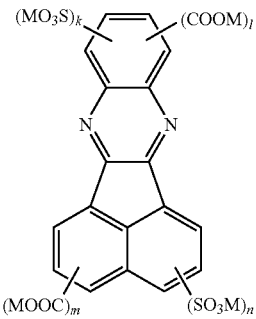
(I)

wherein in the formula (I), M represents a counter ion, and k, l, m, and n represent a number of substitutions (k and l are an integer from 0 to 4, and m and n are an integer from 0 to 6), where k, l, m, and n are not simultaneously 0.

3. The method of producing an optical laminate according to claim 1, wherein the optical laminate is a polarizing element or a retardation element.

4. The method of producing an optical laminate according to claim 1, wherein the base material is a polymer film or a laminate containing a polymer film.

5. The method of producing an optical laminate according to claim 1, wherein the base material is a laminate containing a polymer film and an orientation film.

6. The method of producing an optical laminate according to claim 1, wherein the wet applied film is formed to have a thickness of from 0.5 to 100 um in the step A.

7. The method of producing an optical laminate according to claim 1, wherein the direction of the wind exceeds 0° and is below or equal to 60° relative to the plane of the base material.

8. The method of producing an optical laminate according to claim 1, wherein the wind has a temperature from 0 to 80° C.

9. The method of producing an optical laminate according to claim 1, wherein the flow rate of the wind is above or equal to 1 liter/minute per 100 $cm^2$ of the wet applied film.

10. An image displaying apparatus having an optical laminate obtained by the production method according to claim 1.

11. A method of producing an optical laminate having a base material and an applied film laminated on at least one surface of the base material and containing a lyotropic liquid crystalline compound, comprising:
a step A of applying a solution containing at least one kind of a lyotropic liquid crystalline compound on a base material to form a wet applied film;
a step B of drying the wet applied film by spraying a wind onto the surface of the wet applied film simultaneously with the step A or after performing the step A and before the wet applied film is dried; and
wherein the lyotropic liquid crystalline compound contains a polycyclic compound represented by the following formula (I):

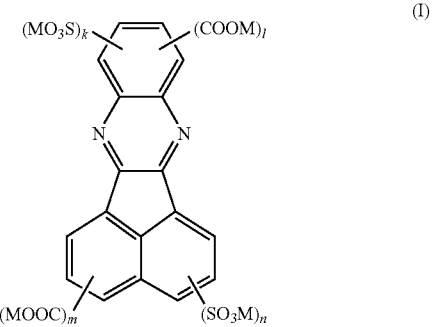
(I)

wherein the formula (I), M represents a counter ion, and k, l, m, and n represent a number of substitutions (k and l are an integer from 0 to 4, and m and n are an integer from 0 to 6), where k, l, m, and n are not simultaneously 0.

* * * * *